Feb. 17, 1970     R. T. MEADOWCROFT     3,495,749
MOTORCYCLE SKI RACK
Filed Dec. 21, 1967
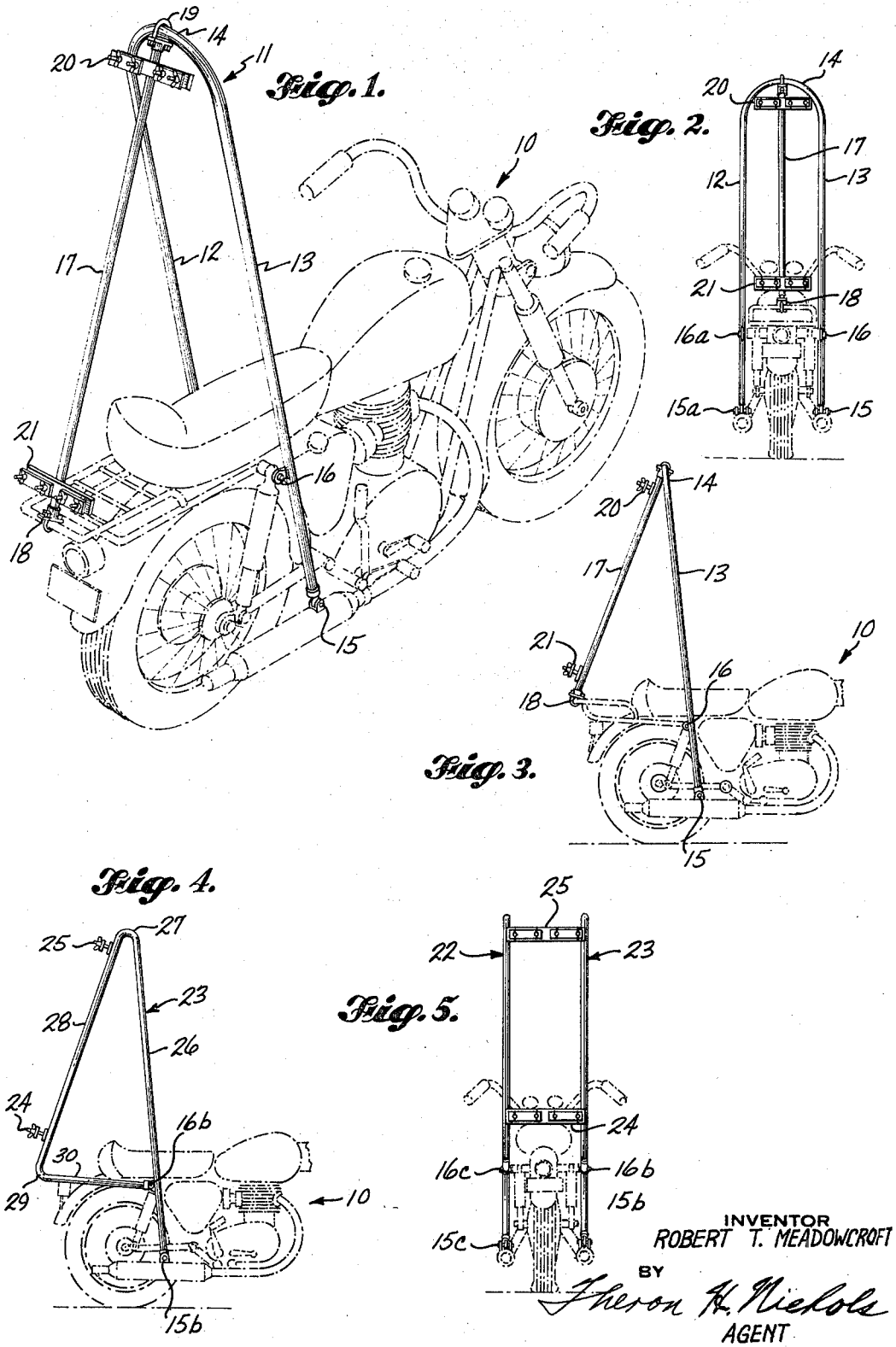
INVENTOR
ROBERT T. MEADOWCROFT
BY
Theron H. Nichols
AGENT United States Patent Office 3,495,749
Patented Feb. 17, 1970

3,495,749
MOTORCYCLE SKI RACK
Robert T. Meadowcroft, Renton, Wash.
(239 Spruce St., Audubon, N.J. 08106)
Filed Dec. 21, 1967, Ser. No. 692,523
Int. Cl. B62j 11/00
U.S. Cl. 224—39                              8 Claims

ABSTRACT OF THE DISCLOSURE

A rack for a vehicle comprising three upstanding rods, all interconnected at their upper ends and brackets on the single aft rod for supporting and carrying elongated sports equipment in a convenient economical, and space saving manner. A modification includes four upstanding rods, the upper connections to the vehicle of the upstanding rods of both modifications being in the horizontal plane tangent to the upper periphery of the vehicle rear wheel.

SUMMARY OF THE INVENTION

This invention pertains to a rack for a vehicle, such as but not limited to motorcycles comprising an upstanding inverted U-bar with the lower ends secured to the opposite sides of the motorcycle and a third upstanding bar connected between the rear of the motorcycle and the top of the inverted U-bar so that brackets may be attached to the rear bar for conveniently and economically support and carry elongated sports equipment, as skis, on the motorcycle in a space saving manner.

A modification comprises two allochiral bent rods on opposite sides of the motorcycle and interconnected with the ski brackets to form a second rigid ski rack.

Carrying or transporting skis or other elongated sports equipment on small vehicles such as motorcycles has been quite a problem.

Accordingly, a principal object of this invention is to provide a method for carrying elongated items on small vehicles as motorcycles.

Another principal object of this invention is to provide a rack for carrying out the new method of carrying elongated items on motorcycles.

A further object of this invention is to provide an elongated item rack for small vehicles having only three upstanding bars.

A still further object of this invention is to provide an elongated item rack for small vehicles having two interconnected bent bars on opposite sides of the vehicle for supporting and carrying the item in a convenient, economical, and space saving manner.

Other objects and various advantages of the disclosed elongated item ski rack will be apparent from the following detailed description, together with the accompanying drawings, submitted for purposes of illustration only.

BRIEF DESCRIPTION OF FIGURES

The drawings diagrammatically illustrate by way of example, not by way of limitation, two forms of the invention wherein like reference numerals designate corresponding parts in the several views in which:

FIG. 1 is a schematic, perspective view of a ski rack from the right rear illustrated in solid lines on a motorcycle illustrated in broken lines;

FIG. 2 is a rear view of FIG. 1;

FIG. 3 is a side view of FIG. 1 with parts cut away for clarity of disclosure;

FIG. 4 is a schematic side view of a modification of FIG. 1 with parts cut away for purposes of clarity; and FIG. 5 is a rear view of the embodiment of FIG. 4.

DESCRIPTION OF THE PREFERRED EMBODIMENT

The invention is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

FIG. 1 discloses in perspective the preferred embodiment of the invention, for use on a small vehicle, such as a motorcycle 10, of a rack 11 for supporting and carrying various elongated items, such as but not limited to, a pair of water or snow skis.

Rack 11 of FIG. 1 comprises an inverted U-shaped, front frame formed of two upstanding bars, 12 and 13, preferably tubes for lightness and strength, both integrally connected at the top with an arcuate portion 14, and the lower ends of each as rod 13, for example, having adequate vertically spaced apart connection means 15 and 16, as quick detachable wing nuts, or the like on to studs welded to the sides of the motorcycle 10. Similar quick connection means 15a and 16a secure bar 12 to the vehicle 11.

A rear upstanding bar 17 has its lower end connected to the vehicle aft end with a suitable connection means 18 as a strap around a luggage rack brace and bolted to the lower end of the bar. This lower connection is well below the center of gravity of the occupant of the vehicle and accordingly and preferably in the horizontal plane which is tangent to the upper periphery of the rear wheel, as illustrated in FIGS. 1–3.

A U-bolt 19 connects the upper end of rear bar 17 to the arcuate portion 14.

Upper and lower brackets, 20 and 21, respectively, are welded transversely to rear bar 17 for securing the elongated items, as skis in this case, to the rack.

MODIFICATION

FIGS. 4 and 5, side and rear views disclose a modified ski rack comprising two bent side bars 22 and 23, FIG. 5 interconnected with upper and lower brackets 24 and 25, respectively. While suitable connection means 15b and 16b similar to 15 and 16 of the first embodiment secure right side 23 to the vehicle, similar connection means 15c and 16c secure the left side 22 to the vehicle. Connection means 16b and 16c also secure the end of bars 23 and 22, respectively to the vehicle. The preferable location of the connections 16b and 16c is in the horizontal plane that is tangent to the upper periphery of the rear wheel, as illustrated in FIGS. 4 and 5 to provide the preferred spacing between the upper and lower connections of the upstanding bars.

While not shown, padded back rests may be attached to upstanding bars 12 and 13, FIG. 1, or 22 and 23, FIG. 5, if so desired.

Bar 23 comprises an upright portion 26, a sharp bend 27 at the top, a rear downwardly extending portion 28, an approximately right angle bend 29, and a horizontal forwardly extending portion 30 to terminate at connection means 16b. Left side bar 22 is the allochiral antilog of bar 23.

Accordingly, a light, convenient, economical, and space saving vehicle rack for elongated items as skids has been disclosed.

While only two embodiments of the invention have been shown in the accompanying specification and drawings, it will be evident that various other modifications are possible in the arrangement and construction of the disclosed vehicle ski rack.

I claim:

1. An elongated item supporting rack for a vehicle having a single rear wheel comprising:
   (a) two forward upstanding bars mounted one on each side of said vehicle single rear wheel, a lower connection connecting the lower end of each of said upstanding bars to each side of the vehicle adjacent to said single rear wheel and below the upper periphery thereof,
   (b) at least one rear upstanding bar, the upper end of said rear upstanding bar being connected to at least one of said forward upstanding bars at its upper end, the lower end of said rear upstanding bar being connected to said vehicle,
   (c) said lower connection of said rear upstanding bar being in a horizontal plane substantially tangent to the upper periphery of said vehicle rear single wheel to provide an economical and space saving elongated item supporting rack for a vehicle, and
   (d) bracket means mounted on said rear upstanding bar for carrying said elongated item.

2. An elongated item supporting rack for a vehicle as recited in claim 1 wherein:
   (a) one of said forward upstanding bars and said one rear upstanding bar forming one continuous bar having only two bends therein to form a closed loop.

3. An elongated item supporting rack for a vehicle as recited in claim 2 wherein:
   (a) said other forward upstanding bar and a second rear upstanding bar forming one continuous bar having likewise only two bends therein to form a closed loop,
   (b) said bracket means interconnecting said bars, and
   (c) said two bracket means being the sole means for interconnecting said two closed loops.

4. An elongated item supporting rack for a vehicle as recited in claim 1 wherein:
   (a) said forward upstanding bars have an arcuate portion interconnecting said two upstanding bars.

5. A supporting rack as recited in claim 1 wherein:
   (a) said supporting rack having two aft upstanding laterally spaced apart bars,
   (b) means for connecting the upper ends of said aft bars to the upper ends of said two foreward upstanding means, and
   (c) screw connections for connecting the lower ends of said aft bars to said vehicle.

6. A supporting rack as recited in claim 5 wherein:
   (a) said bracket means comprises means interconnecting portions of said elongated bar means intermediate said ends of said bar means.

7. A supporting rack as recited in claim 5 wherein:
   (a) said two fore upstanding bars and said two aft upstanding bars forms two integral parallel bars whereby the bracket means may be attached thereto for supporting and carrying said elongated item.

8. An elongated sports equipped rack for a vehicle as recited in claim 1 wherein:
   (a) said bracket means comprises two spaced apart brackets connected to said one rear upstanding bar for supporting and carrying the elongated sports equipment in a convenient, economical, and space saving manner.

References Cited

UNITED STATES PATENTS

| | | | |
|---|---|---|---|
| 3,170,583 | 2/1965 | Meyer | 224—42.1 |
| 3,329,323 | 7/1967 | Tanaka | 224—41 |
| 3,333,750 | 8/1967 | Porter | 224—29 |
| 3,338,484 | 8/1967 | Hall | 224—41 |

FOREIGN PATENTS 1,014,277  5/1952  France.

GERALD M. FORLENZA, Primary Examiner

U.S. Cl. X.R.

224—42.11